Patented May 11, 1937

2,080,263

UNITED STATES PATENT OFFICE 2,080,263

METHOD OF FREEING EDIBLE CRUSTACEAN FLESH FROM CHITIN MATERIAL

Eugene C. Gibson, Springfield, Pa.

No Drawing. Application June 10, 1935,
Serial No. 25,813

6 Claims. (Cl. 17—45)

This invention relates to crustaceans and has particular reference to the flesh of edible crustaceans such as crabs, lobsters and the like. In the description of the invention herein to be disclosed, the crab will be referred to for the purpose of illustration and explanation.

In obtaining crab meat either for use or sale, the present method is practically the same as it was a hundred years ago, that is, the crabs when taken from the water are cooked usually by steam and then their outer shell is cracked and broken and the interior meat removed by hand and sometimes with the aid of a small tool.

It is a well known fact that the flesh of the crab has chitin sub-divisions or partitions, extending in some cases from the walls or outer shell, and this chitin is for the most part very thin, colorless, and in some instances, practically transparent, so that it blends with the meat and is, therefore, indistinguishable. It has always been the endeavor or intention to remove all these chitin particles from the flesh or crab meat before the same is eaten or passed on to retailers, hotels, restaurants and the like. However, the chief difficulty has always been that the crab meat is examined and the chitin particles removed therefrom by the hand-picking method with indifferent labor, which is quite often paid on the poundage rate and, therefore, no very great degree of cleanliness in the meat has ever been possible.

A second difficulty is that even with a conscientious worker or housewife in preparing her own crab meat, it has been quite impossible to detect all these chitin substances or material and, therefore, crab meat has heretofore been prepared with great quantities of the chitin material mixed with the flesh.

These chitin particles or thin wall structures are for the greater part flexible, and as their color approximates and in fact almost exactly matches the flesh itself when they exist in a mass with the flesh, it has been quite impossible to even detect the chitin material by the use of the fingers in attempting to distinguish them from the flesh.

Due to the fact that crab meat heretofore has retained so much of these chitin particles, and the further fact that it is quite difficult even when eating crab meat to detect many of the chitin particles, it is logical to believe that many of the evils attributed to eating crab meat may have been caused by the presence of these chitins in the human stomach.

By the method of producing edible crustacean flesh substantially free from chitin material, it has been found in some instances that from one to two large tablespoonfuls of chitin material has been removed from a pound of crab meat sold on the open market as pure crab meat food. The value of the invention, therefore, will be readily apparent as it insures the pure flesh of the crustacean free from these bony chitin particles which, in any event, would not be held to be beneficial to the human organs.

The object of the present invention is to produce crab meat substantially free from chitin material.

A further object is to cleanse the crab meat of the chitin material immediately after the flesh has been taken from the shells.

Still another object of the invention is to so prepare crab meat and the like that it may be sold to hotels, restaurants, homes and the like, and where no further cleansing of the same will be necessary.

According to the invention, the edible crustaceans, after being taken from the water, are cooked by steam or otherwise and their outer chitin shell cracked, broken apart and the flesh removed. The flesh is then disintegrated and passed beneath ultra-violet light whereby the chitin particles become fluorescent and assume a distinct color from that of the flesh and where same may be readily removed by pincers or tweezers in the hands of an inspector. If desired, the meat may be passed along on a moving belt and means may be provided for agitating it, so that all chitin particles will become apparent as the meat passes from one inspector to another.

It has been discovered that ultra-violet light has practically no visible influence in coloring the flesh of the edible crustacean, but that its effect upon the chitin particles is so marked that it readily distinguishes them from the flesh, causing them to appear fluorescent and to assume a color which is quite distinctive from the color of the meat itself.

This ultra-violet light is electro-magnetic vibration and the rays range from one hundred and thirty-six (136) Ångström units to forty-five hundred (4500) Ångström units, using the Ångström unit as ten to the minus eighth power centimeters or one hundred millionth of a centimeter. It is recommended, however, that the edible crustacean flesh be subjected to the "near" ultra-violet or the longer wave length end of the ultra-violet range, because these longer wave length ultra-violet rays are found to be most efficient, and as the chitin pickers or inspectors will be subject to the rays over lengthy periods, the advisability of using this range will be apparent.

Crustaceans may also be opened under the ultra-violet light and the flesh picked therefrom and the chitin removed as each morsel of meat is taken from the shell.

Of course, the methods explained herein are subject to changes in various ways without departing from the invention herein set forth and hereafter claimed.

The invention is hereby claimed as follows:

1. The method of obtaining edible crustacean flesh free from chitin, comprising the steps: removing the meat from the shell, then subjecting it to ultra-violet light rays for distinguishing the chitin from the flesh, and then removing the chitin.

2. The method of obtaining edible crustacean flesh free from chitin, comprising the steps: removing the meat from the shell, then disintegrating the meat, then subjecting it to ultra-violet light rays of the longer wave end of the range for distinguishing the chitin from the flesh with the naked eye, and then removing the chitin.

3. The method of obtaining edible crustacean flesh free from chitin, comprising the steps: removing the meat from the shell, then passing it under ultra-violet light rays for distinguishing the chitin from the flesh, and then removing the chitin.

4. The method of obtaining edible crustacean flesh free from chitin, comprising the steps: removing the meat from the shell, then disintegrating the meat, then passing it under ultra-violet light rays for distinguishing the chitin from the flesh, and then removing the chitin.

5. The method of obtaining edible crustacean flesh free from chitin, comprising the steps: removing the meat from the shell, then subjecting it to ultra-violet light rays while agitating the meat, whereby the chitin is rendered fluorescent to the naked eye, and then removing the chitin.

6. The method of obtaining edible crustacean flesh free from chitin, comprising the steps of first opening a crustacean outer shell, and then subjecting the opened crustacean to ultra-violet light, and then picking out the meat from chitin formation.

EUGENE C. GIBSON.